United States Patent [19]
Benktander et al.

[11] Patent Number: 5,145,379
[45] Date of Patent: Sep. 8, 1992

[54] DEVICE FOR THE ELECTRICAL CONNECTION OF SENSORS ON BEARINGS

[75] Inventors: Sven Benktander, Gothenburg, Sweden; Heinz Kiener, Waigolshausen; Jürgen Kober, Schwebheim, both of Fed. Rep. of Germany

[73] Assignee: SKF GmbH, Schweinfurt, Fed. Rep. of Germany

[21] Appl. No.: 672,744

[22] Filed: Mar. 21, 1991

Related U.S. Application Data

[63] Continuation of Ser. No. 439,789, Nov. 21, 1989, abandoned.

[30] Foreign Application Priority Data

Nov. 24, 1988 [DE] Fed. Rep. of Germany ....... 3839558

[51] Int. Cl.⁵ ............................................. H01R 13/66
[52] U.S. Cl. ........................................ 439/34; 384/448
[58] Field of Search ..................... 384/448; 439/16, 34

[56] References Cited

U.S. PATENT DOCUMENTS 4,783,180 11/1988 Hayashi .............................. 384/448
4,875,785 10/1989 Santos et al. ........................ 384/448

FOREIGN PATENT DOCUMENTS 2207470 2/1989 United Kingdom ................ 384/448

Primary Examiner—Gary F. Paumen
Attorney, Agent, or Firm—Rosen, Dainow & Jacobs

[57] ABSTRACT

In a device for the electrical connection of preferably ALS sensors in or on roller bearings of truck wheels, a seat casing is provided for the transfer of the ALS sensor's signals from one side of the bearing ring to the other, which seat casing is located between the bearing ring and, e.g., the shaft. It serves as signal conductor or it is equipped with conductors consisting of wires, flat band conductors, conductive layers, or the like. The connection to the ALS sensor or a plug ring with a connecting cord, occurs preferably by way of slip rings 10, to exclude all operational interference induced by a creeping motion in a circumferential direction of the otherwise fixed bearing ring. In addition, without conductors or a cord the bearing will be simpler to assemble.

13 Claims, 3 Drawing Sheets

DEVICE FOR THE ELECTRICAL CONNECTION OF SENSORS ON BEARINGS

This application is a continuation of application Ser. No. 439,789 filed Nov. 21, 1989, now abandoned.

BACKGROUND OF THE INVENTION

The invention relates to a device for the electrical connection of sensors on bearings. This invention is related to a copending patent application "Electrical Plug-In Connection For Sensors On Bearings," Ser. No. 439,877 filed Nov. 2, 1989, having a common assignee.

Sensors for antilocking systems (ALS) are increasingly incorporated in bearing units or bearings for, e.g., truck wheels. These may be combined with, seals, retaining rings, and the like, and connected to the outer race or non-rotating bearing ring. The inner race or rotating inner bearing ring is further equipped with a pulse ring which activates the sensor so that during a revolution a series of electrical pulses is suppled to an electronic control. Because such elements are incorporated into the bearing, it is usually the manufacturer's responsibility to have the component built in.

In double-row rolling bearings, in particular, the ALS sensors are inserted between the rows of rolling elements because this is where, relatively, the most space is available. A similar arrangement is proposed in the copending U.S. patent application Ser. No. 354,494 filed May 19, 1989. The ALS sensor is embedded in a synthetic ring holding together the divided inner bearing rings. In this execution, the connecting cord is guided outward through an axial channel cut in the bore surface of one of these inner rings. This weakens the inner ring involved, resulting in a lower carrying capacity. For this reason the bearing must be rotated over the carrying axle in such manner that the channel is located in the area with the least load during operation. In addition, the embodiment mentioned requires special treatment of the inner rings involved, during which process the risk exists that they may be confused with other mass-produced items or similar bearing components. In addition, certain constrained positioning of the bearing is required.

Furthermore, the connecting cord issuing from one side of the bearing must be sufficiently long to allow connection to the electronic control after mounting. Both during transportation and during assembly the connecting cord runs a great risk of being damaged or torn. Often, a defect in the ALS system is found only during operation, after the assembly is completed, leading to a time-consuming search.

It is accordingly the principal object to the invention to create a device for the electrical connection to a bearing, whereby no channels for the connecting cord are needed in either the bearing rings or the shaft, and whereby connecting cords issuing from the bearing are not necessarily required.

BRIEF DESCRIPTION OF THE PRESENT INVENTION

The object of the invention is achieved through the use of a seat casing mounted between the bearing ring and its carrier element, such as a shaft, hub, axle, or housings with a signal conductor insulated electrically from the bearing ring and the carrier element.

The seat casing may be constructed with relatively little wall strength. The casing builds the electrical connection between the sensor and a cord, plug, etc. installed, for example, during the assembly process, at the side of the bearing. No changes or special preparations are needed for the bearing or its carrier element, be it a hub, housing or axle. The seat casing may be made of sheet metal, a synthetic or ceramic material, or the like. It is only necessary that the signal conductor is electrically insulated against all the other components. This may be done through various known techniques, e.g., coating with a synthetic material, vapor-deposition, oxidation or coating with a ceramic material. Also, the seat casing in its built-in position should be stable and have current carrying capacity. For this purpose it is axially longer than the bearing ring involved, so that the projecting sections are suitable for connection to the sensor on the one hand, and the connecting cord on the other.

DESCRIPTION OF THE DRAWINGS

Further characteristics of the invention are described hereafter with the aid of the examples shown in the drawing; wherein.

DETAILED DESCRIPTION OF A PREFERRED EMBODIMENT

Figure 1:
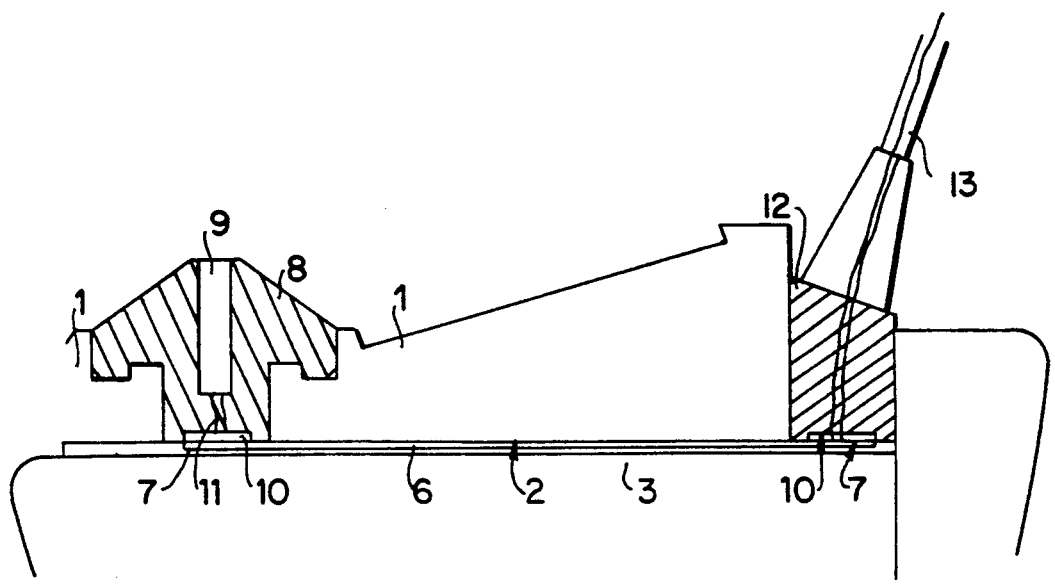
FIG. 1 is part of a cross section of a double-row roller bearing with a seat casing made of sheet metal.

The embodiment shown in FIG. 1 shows a general view according to the invention, wherein a wheel bearing unit with an integrated ALS sensor for a truck is illustrated. Two inner bearing rings 1, of which only the right-hand one is shown in full, are arranged on a common seat casing 2, made of sheet metal, attached to a shaft 3. The outer surface of the seat casing below the bearing ring (only the inner ring halves are shown) functions as the bearing seat. In the right-hand bearing ring 1, the seat casing 2 has a recess 4 shaped into the material according to FIG. 2, which extends with its circumferentially widened ends 5 on either side beyond the inner ring 1. The depth of the recess 4 is about half the sheet metal thickness, as is shown clearly in FIG. 3. In the recess 4, a strip has been glued with juxtaposed flat band conductors 6 which are insulated on all sides. The widened ends 5 are equipped with intermittent contacts 7 which are axially aligned and stick out slightly beyond the surface. This is also shown in FIG. 3.

The section of the seat casing 2 projecting to the left is equipped with a retaining ring 8 of a synthetic material with an embedded ALS sensor 9, designed to serve at the same time as a retaining ring for both inner rings 1. In its bore surface two axially juxtaposed slip rings 10 have been sunk which operate in conjunction with two intermittent contacts 7, show in the left side of FIG. 1, which are connected by way of two wires 11 with the ALS sensor 9.

The section of the seat casing 2 projecting to the right is equipped with a plug ring 12 with a connecting cord 13 leading to an electronic control not shown here. In the same way, slip rings 10 are located in the bore surface, which operate in conjunction with the intermittent contacts 7 shown in FIG. 2 to the right. Accordingly, the ALS sensor 9 is connected electrically with the electronic control. To install the plug ring 12, it is axially slipped over the shaft 3 and the seat casing 2 and in the position as shown in FIG. 1 an electrical connection results between the innermost intermittent contacts 7 on seat casing 2 and the slip rings 10 in the bore surface of ring 12.

When the inner ring 1 shown in the drawing executes a creeping turning motion when loaded, the slip rings 10 guarantee an error-free, reliable electrical connection and prevent the risk of the cord being torn. In addition, the assembly and mounting of the roller bearing is greatly simplified, leading to an error-free operation in series.

Figure 2:
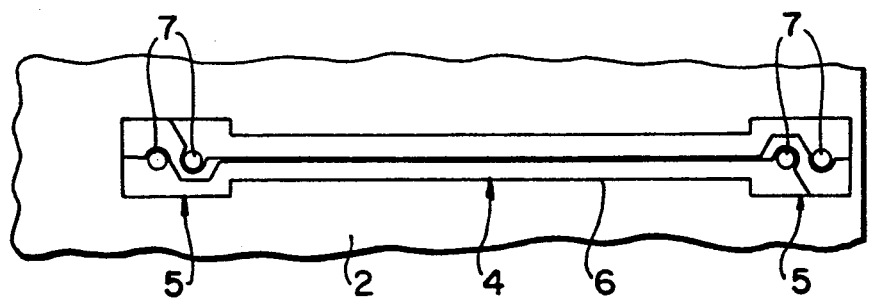
FIG. 2 is part of a top view of the seat casing according to FIG. 1 near the signal conductor.
Figure 4:
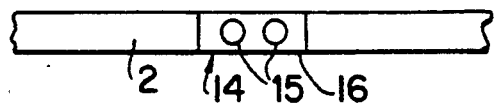
FIG. 4 is a view according to FIG. 3 of another seat casing with embedded conductors.
Figure 3:
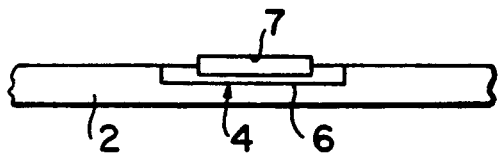
FIG. 3 is part of a cross-section in uncoiled form of the seat casing according to FIGS. 1, 2 near the signal conductors executed as flat band conductors.

The embodiment of a seat casing 2 shown in FIG. 4 is equipped with a contoured—but perforated—relief groove 14 according to FIG. 2, in which ready-made contacts and their connecting conductors 15 are located, anchored in a synthetic material 16. The component may also be ready-made in this manner, and incorporated. The connecting function is the same as the one described for FIGS. 1, 2 and 3.

Figure 5:
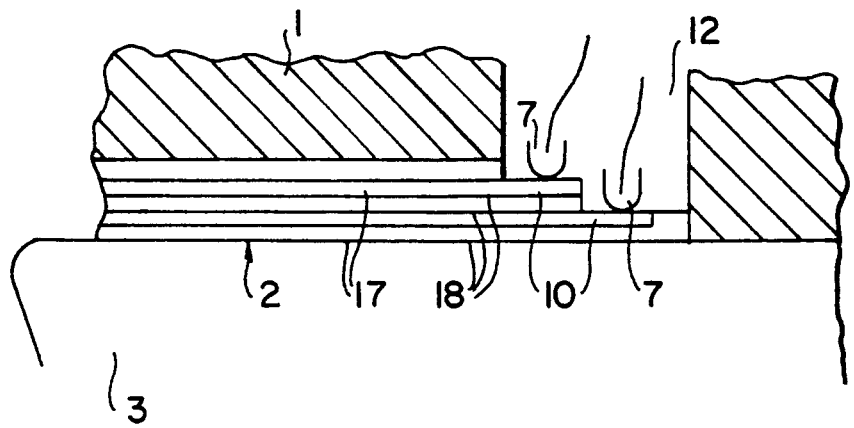
FIG. 5 is part of a longitudinal section of a multi-layered seat casing near the connection with the connecting cord.

For the example show in FIG. 5 the seat casing 2 is shown in a multi-layered construction. Cylindrically closed, metallic conducting layers 17, e.g., made of copper, are coaxially superimposed and electrically insulated from one another, from the axle 3 and the inner ring 1 through synthetic layers 18. The sections projecting on either side, of which the right-hand one is shown, are stepped so that the freely located conducting layers 17 can be used as axially juxtaposed slip rings 10. Accordingly, the plug ring 12—shown here—for connection with the element control, is equipped with only two juxtaposed intermittent contacts 7. Here, too, a creeping motion of the inner ring 1, when the plug ring 12 is fixed, will involve no risk for the operation.

Figure 6:
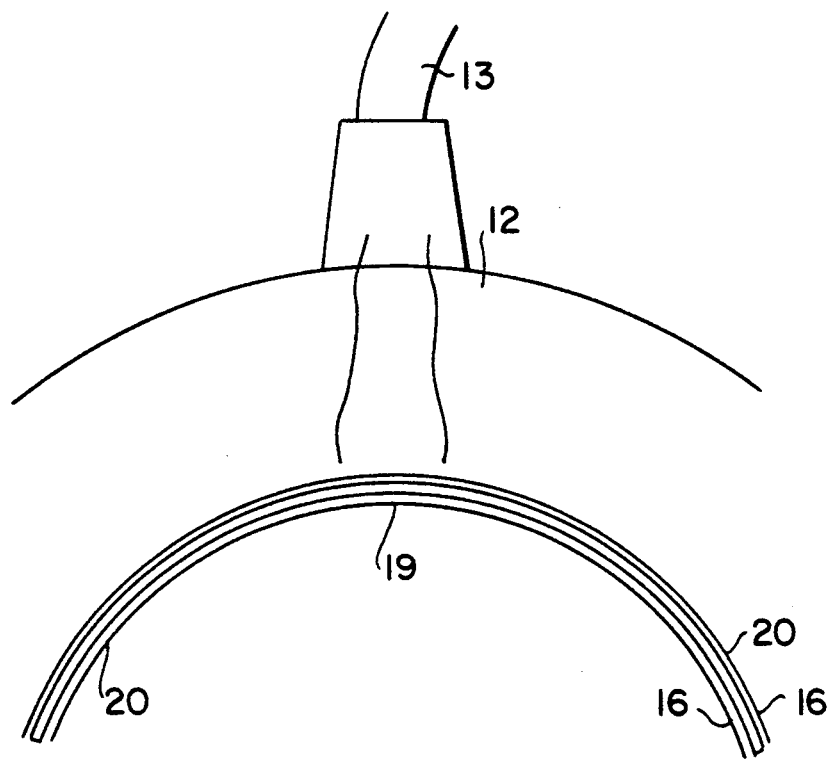
FIG. 6 is part of a cross-section near the seat casing with half-dome-shaped signal conductors.

In the example according to FIG. 6, two half-domes 20, constituting the signal conductors, are electrically separated from each other through diametrically opposite slots 19, and radially embedded on either side in a synthetic material 16. The connection to the ALS sensor 9 or the connecting cord 13 may be executed in one of the manners described above.

Figure 7:
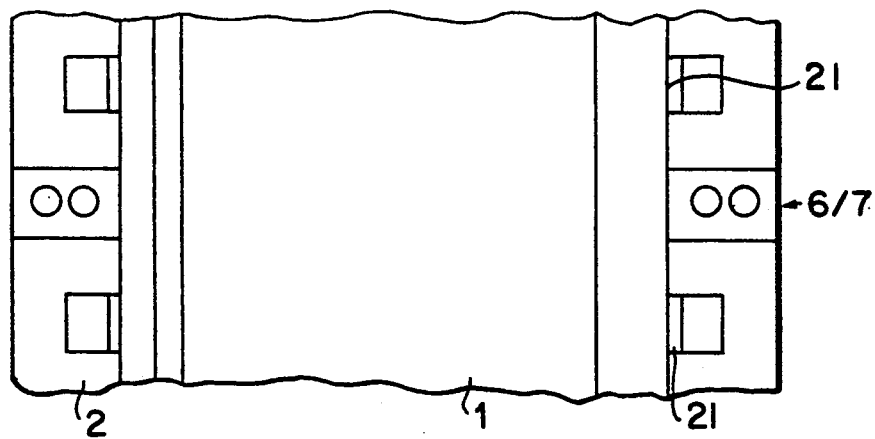
FIG. 7 is part of a top view of a seat casing with retaining tabs bent against the inner rings.

FIG. 7 shows a seat casing 2 with free intermittent contacts 7 on either side, connected with flat band conductors 6 according to FIG. 3, which casing is incorporated in an inner ring 1 and axially attached thereto in a form-fitting manner by clinched retaining tabs 21.

The embodiment shown, in particular the shape of the seat casing, are only examples. Obviously, within the framework of the invention it is possible to bend the projecting end sections like a flange, so that the intermittent contacts extend in one radial plane.

What is claimed is:

1. In a device for the electrical connection of a sensor on a bearing, wherein said bearing includes first and second axially spaced inner bearing rings supported by a bearing seat of a carrier element, the improvement wherein said device comprises a sensor located on one side of one of said inner bearing rings, a seat casing located between said one inner bearing ring and said bearing seat, at least one signal conductor extending along said seat casing and being electrically insulated from said one inner bearing ring, and means connecting said conductor to said sensor, said connecting means extending axially past the end of said one inner bearing ring opposite said one side thereof to permit external electric connection to said sensor.

2. Device according to claim 1, wherein said seat casing is a multi-layered structure insulated from the bearing ring and the carrier element.

3. Device according to claim 1, wherein said seat casing includes at least two mutually insulated sections.

4. Device according to claim 1, further including at least two essentially cylindrically closed, coaxially superimposed sections.

5. Device according to claim 1, wherein said seat casing includes at least two essentially half-dome-shaped sections.

6. The device according to claim 1, wherein said seat casing includes an axial slot through which said signal conductor is guided.

7. The device according to claim 1, wherein said seat casing is cylindrically shaped, with at least one axially extending, radially impressed channel containing said signal conductor.

8. The device according to claim 1, wherein said signal conductor is a flat band conductor embedded in a synthetic material.

9. The device according to claim 1 wherein said seat casing extends beyond either side of said one inner bearing ring and further comprising, electrical contacts coupled to said seat casing which are connected to said signal conductor.

10. The device according to claim 1, further comprising electrical contacts which comprise a plurality of intermittent contacts and are electrically connected to corresponding intermittent contacts on said sensor.

11. The device according to claim 10 wherein at least one of said plurality of said corresponding intermittent contacts is a slip ring.

12. The device according to claim 1, wherein said bearing comprises a double-row roller bearing said separated said bearing rings, said seat casing extending beyond said inner bearing rings, and a retaining ring of a synthetic material including said sensor is embedded between, and connects, said bearing rings.

13. Device according to claim 1, wherein said seat casing is sheet metal and has clinched retaining tabs bent against the sides of one of the bearing rings.

* * * * *